Nov. 17, 1936.                P. FISCHER                2,060,931
SUPPORT FOR SHELVES, TABLE TOPS AND THE LIKE
Filed June 14, 1935
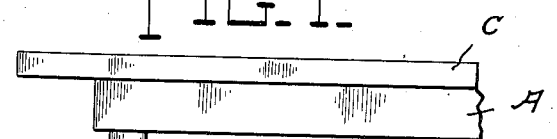
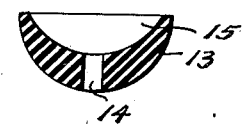
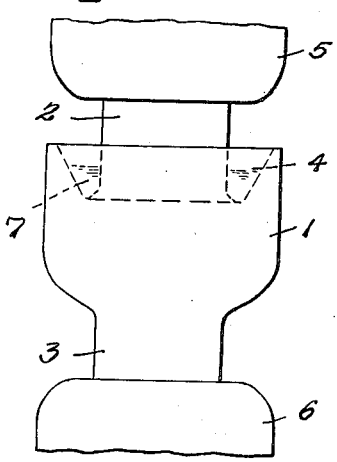
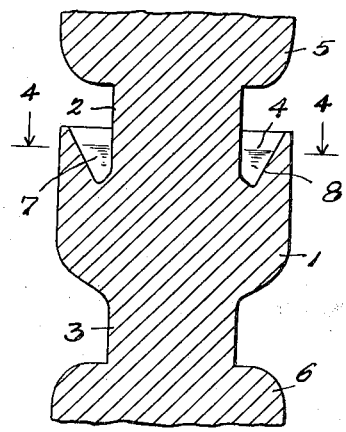
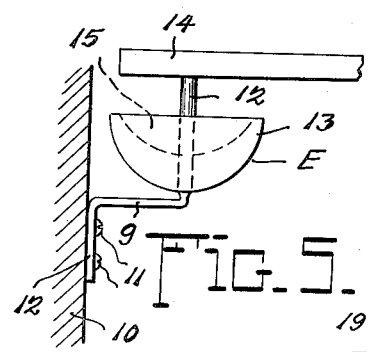
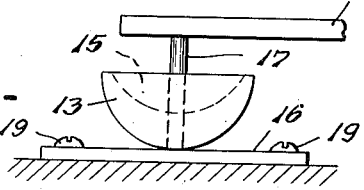
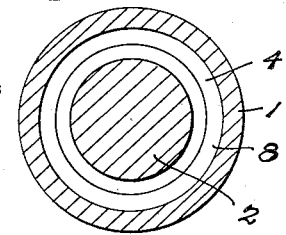
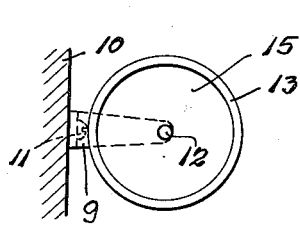
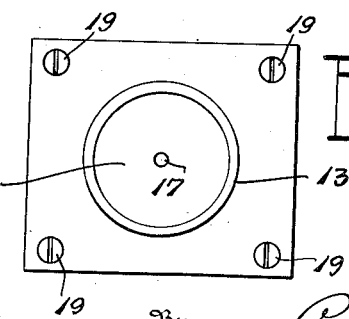
Inventor
PETER FISCHER
By Robb & Robb
Attorneys Patented Nov. 17, 1936

2,060,931

UNITED STATES PATENT OFFICE 2,060,931

SUPPORT FOR SHELVES, TABLE TOPS, AND THE LIKE

Peter Fischer, Palo Alto, Calif.

Application June 14, 1935, Serial No. 26,684

2 Claims. (Cl. 43—109)

The primary object of the present invention has been to devise a simple and efficient device to prevent the access of insects, especially ants or the like, to a surface used for storing food supplies or similar articles, which usually attract such insects.

It is an object of the present invention to provide an ant trap of a construction adapted to carry or support a surface, table, shelf, or the like, to which ants or other insects, under ordinary conditions, would have access.

The ant trap of the present invention consists of a body structure provided with a recess which may be filled with water, poisonous fluid, or any chemical compound used in the destruction of insects.

The body structure is further provided with supporting means, which are positioned within said recess in such a manner as to present the only way of access for insects to reach a surface supported thereby, and in view of the fact that said recess is filled with a substance which will repel the insects, the access of the latter to said supporting surface is thereby effectively prevented.

Ants or other insects which are quite a nuisance in certain locations may be, by the use of the present invention, kept away from places where articles are stored which may otherwise be easily destroyed by the same, or rendered unsuitable for human consumption.

Other and further objects of the present invention will become apparent from the following description and drawing, in which:—

Figure 1 illustrates a table structure, the legs of which have been provided with my device for the prevention of the access of insects to a table surface.

Figure 2 is an enlarged detail view in elevation of a portion of the device illustrated in Figure 1.

Figure 3 is a central vertical cross section of Figure 2, and shows clearly the arrangement of the recess which may be filled with any suitable fluid or chemical compound.

Figure 4 illustrates a cross section of the device shown in Figure 3, the section being taken on line 4—4 of said figure.

Figure 5 illustrates another form of my present invention, which will be especially adaptable in connection with a shelf or other supporting surface.

Figure 6 is a top view of Figure 5.

Figure 7 shows a third form of my present invention.

Figure 8 illustrates a top view of Figure 7.

Figure 9 is a central vertical cross section of the semi-spherical body portion employed in the forms of my invention illustrated in Figures 5 and 7.

Referring now to Figure 1, A indicates a table structure, or the like, which is provided with legs, only one of which is shown, designated B, and the table surface C in connection with which the device of the present invention may be used and arranged in the manner as shown at D.

Referring now to Figure 2, it will be seen that the ant trap of the present invention consists of a body portion 1, provided with stem portions 2 and 3, extending upwardly and downwardly therefrom. The body portion 1, near its juncture with the stem portion 2, is provided with the annular recess 4 for the reception of a fluid such as water or any suitable chemical compound for preventing the access of insects from the body portion to stem 2. The stem portion 2 may be integral with the upper leg portion 5 of the leg member B while the lower stem portion 3 may be integral with the portion 6 of said leg B.

If desired, however, the members 1, 2 and 3 may be manufactured as a separate unit, which may be interposed between the portions 5 and 6 of the leg B of a table or like structure, and connected thereto in a manner as will be obvious to those versed in the art.

It will, therefore, be seen that insects which will climb upwardly on the leg portion 6 and body portion 1, will be unable to proceed further to the stem portion 2, without passing through the fluid or chemical compound 7, contained in the annular recess 4, described above, and insects will be repelled by the fluid, or will slide down the diverging side wall 8 of said annular recess into the fluid, and will be destroyed.

In Figure 5 I have shown another form of structure of my invention, which may be efficiently used in conjunction with a shelf surface or the like, adapted to be supported thereby. The form of ant trap illustrated in Figure 5, consists of a bracket 9 adapted to be secured to a wall or similar surface, as indicated at 10, by means of screws 11, passing through holes in the bracket 9. The bracket 9 is of a Z-like configuration, a downwardly extending portion 12 of which is secured to a wall 10, as previously referred to, while the other upwardly extending portion 12 which may be preferably of a round configuration in cross section, is adapted to carry a semi-spherical member or body 13, which is provided with an opening 14 of somewhat smaller diameter than the diameter of the portion 12 of bracket 9 so that an absolutely fluid tight fit between the body portion 13 and the bracket portion 12 may be obtained when the semi-spherical member is attached to the latter in a manner as clearly shown in Figure 5.

The body portion 13 may be made from rubber or any suitable material, and the side wall confining the hole 14 may be provided with rubber cement or any other suitable adhesive material to assure an absolutely fluid tight connection between the members 12 and 13. The upwardly extending portion of the bracket 9 is adapted to support a shelf surface, or the like, as indicated at 14 in Figure 5.

It is to be understood, however, that a plurality of my novel ant trap units, generally indicated at E, are to be used for supporting the shelf surface 14. Only one of these members has been illustrated in Figure 5. The semi-spherical body portion 14 is provided with a concave recess 15 adapted to contain water or poisonous material, and it will be seen that the access of insects, such as ants or the like, from the body portion 13 to the shelf surface 14, will be effectively prevented.

Figures 7 and 8 illustrate a third form of the device of my present invention. The construction of this modified structure is very similar to the construction disclosed in Figure 5, with the exception of the bracket 9. The supporting bracket of the device as shown in Figure 7 comprises a base member or plate 16, which is provided with an upwardly extending portion 17, preferably of circular cross-section, while the semi-spherical body portion 13 is of the same configuration as shown in Figure 5, and is also provided with a concave recess 15, as clearly shown in Figure 7. The upwardly extending member or stem 17 is adapted to support a shelf or like surface 18 adapted to be used for storing articles which attract insects. It will, therefore, be seen that the construction disclosed in Figure 7 provides also a fluid trap for insects climbing upon the spherical body member 13 and will prevent the access of the same to the supporting member 18 in a manner as specifically described in connection with Figure 5.

The base member 16 may be secured to a supporting surface or the like by means of screws 19, and it will be also understood that a plurality of the devices illustrated in Figure 7 have to be used for supporting the surface 18, as will be obvious.

It will be seen from the foregoing that the insect trap of the present invention provides a very efficient means for preventing the access of insects to any supporting surface, and its construction is such that it may be used for supporting various kinds of shelf surfaces or the like, as will be obvious to those skilled in the art. The article of the above described invention may be very cheaply manufactured, and its installation is very simple to render it adaptable for various conditions and uses.

While the specific details of the present invention have been herein shown and described, it is to be understood that the invention is not to be confined thereto, and changes and alterations may be made without departing from the spirit of the invention, as defined by the appended claims.

Having thus described my invention, what I claim as new and desire to secure by Letters Patent of the United States, is:—

1. As a new article of manufacture, a support for shelves and the like, including a substantially vertical stem adapted to provide a support for a shelf, and a receptacle adapted to contain an insecticide and comprising a semi-spherical body of rubber provided with a concave recess in its upper side and formed with a central opening of slightly less diameter than said stem, the upper end of said opening terminating at the base of said recess and below the marginal edge of the body, and receiving the stem when the latter is pressed therethrough so that the body of the receptacle snugly fits around said stem, the upper terminal of the stem aforesaid being some distance above the uppermost portion of said receptacle.

2. As a new article of manufacture, a support for shelves and the like, consisting of a bracket including an upstanding vertical stem of substantially round contour, a horizontal portion extending from the lower end of the stem, and a vertical attaching portion extending downwardly from said horizontal portion, the said horizontal and vertically extending portions of the bracket being flattened and the vertical portion apertured for reception of attaching fastenings, and a receptacle mounted on the said vertically extending stem and comprising a rubber body of semi-spherical form provided in its upper surface with a concave recess to hold an insecticide, said body having a central vertical opening therethrough of slightly smaller diameter than the stem so that the portions of the body around the stem will be compressed tightly into engagement therewith when the stem is passed through said body, the opening through the body terminating at the base of the recess and below the upper marginal edge of the body, and the upper terminal of the stem being disposed in a plane spaced above the body for the purpose set forth.

PETER FISCHER.